US012619188B2

(12) United States Patent
Machida

(10) Patent No.: US 12,619,188 B2
(45) Date of Patent: May 5, 2026

(54) PRINTING SYSTEM, METHOD OF CONTROLLING THE SAME, AND STORAGE MEDIUM

(71) Applicant: CANON KABUSHIKI KAISHA, Tokyo (JP)

(72) Inventor: Takuya Machida, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/981,109

(22) Filed: Dec. 13, 2024

(65) Prior Publication Data

US 2025/0224691 A1 Jul. 10, 2025

(30) Foreign Application Priority Data

Jan. 5, 2024 (JP) ................................ 2024-000437

(51) Int. Cl.
*G03G 21/00* (2006.01)
*G03G 21/06* (2006.01)
*G03G 21/20* (2006.01)

(52) U.S. Cl.
CPC ........... *G03G 21/06* (2013.01); *G03G 21/203* (2013.01)

(58) Field of Classification Search
CPC ............................ G03G 21/06; G03G 21/203
USPC ................................ 399/38, 42, 44, 45, 128
See application file for complete search history.

(56) References Cited

FOREIGN PATENT DOCUMENTS

| | | | |
|---|---|---|---|
| JP | H11258881 A | | 9/1999 |
| JP | 2017067808 | * | 4/2017 |
| JP | 2021190537 | * | 12/2021 |

* cited by examiner

*Primary Examiner* — Hoan H Tran
(74) *Attorney, Agent, or Firm* — Canon U.S.A., Inc. IP Division

(57) ABSTRACT

A printing system, including a static elimination apparatus configured to change a setting of static elimination processing, includes at least one processor and at least one memory that is in communication with the at least one processor. The at least one memory stores instructions for causing the at least one processor and the at least one memory to acquire a type of a sheet to be used in printing processing, acquire a printing environment, acquire a rough indication value for a charge adjustment value for a static elimination corresponding to the type of the sheet and the printing environment, and control a display unit to perform display of the rough indication value for the charge adjustment value for the static elimination and to perform display to give an instruction for continuation of the printing processing.

7 Claims, 11 Drawing Sheets

FIG.11

1101

| PRINTING ENVIRONMENT | TYPE OF SHEET | ROUGH INDICATION VALUE |
|---|---|---|
| LOW TEMPERATURE AND LOW HUMIDITY | FILM | 40 TO 55 |
| | SYNTHETIC PAPER | 40 TO 65 |
| | PLAIN PAPER | 0 TO 6 |
| NORMAL TEMPERATURE AND NORMAL HUMIDITY | FILM | 30 TO 40 |
| | SYNTHETIC PAPER | 30 TO 50 |
| | PLAIN PAPER | 0 TO 4 |
| HIGH TEMPERATURE AND HIGH HUMIDITY | FILM | 20 TO 30 |
| | SYNTHETIC PAPER | 20 TO 40 |
| | PLAIN PAPER | 0 TO 2 |

PRINTING SYSTEM, METHOD OF CONTROLLING THE SAME, AND STORAGE MEDIUM

BACKGROUND

Field of the Disclosure

The present disclosure relates to a printing system including a static elimination apparatus, a method of controlling the printing system, and a storage medium.

Description of the Related Art

A recording medium used in a printing operation (hereinafter referred to as a "sheet") is conveyed in a state of being statically charged due to a residual charge in an electrophotographic process or slight friction generated with conveyance rollers or guides during the conveyance of the sheet. The static electricity can cause sheets to stick to each other. Additionally, dust and paper dust sticking to printed products can affect the quality thereof.

Plain paper has low electrical resistance, which facilitates charge transfer in a sheet, and the amount of charge itself is small. Thus, the static electricity can quickly be eliminated. However, a sheet made with synthetic resin (plastic), such as thick paper, synthetic paper, and coated paper, has high electrical resistance, which makes it difficult to cause charge transfer in the sheet. As a result, sheets, such as synthetic paper and coated paper, tend to be more easily charged and have more residual charge. Additionally, it is generally known that sheets are susceptible to the environment, especially to humidity, and are more statically charged due to a smaller amount of discharge into the air in low humidity environment.

If post-processing were to be performed with sheets sticking to each other, that could affect processing of aligning the sheets and the quality of the post-processing, additionally, trigger a jam due to a paper feeding failure or a sheet conveying failure, causing damage to the sheets and the apparatus.

To avoid such a risk, it is desirable that static electricity on the sheets after a printing process be eliminated before the execution of the post-processing. A technique is proposed of applying a voltage to a pair of conveyance rollers disposed downstream in a sheet conveyance direction to neutralize the electrification charges on the sheets (refer to Japanese Patent Application Laid-Open No. H11-258881).

As described above, the static elimination performed with the configuration of applying a voltage to conventional conveyance rollers (hereinafter referred to as "static elimination rollers") neutralizes charged static electricity using application of a charge opposite from the charge on a sheet via the static elimination rollers. Thus, the amount of static electricity to be eliminated by the static elimination rollers (the application of a charge opposite from the charge on a sheet to the static elimination rollers) is set according to the amount of the charge on the sheet. This means that the optimum charge adjustment value for static elimination varies depending on the printing environment, such as the humidity and the type of sheet.

If a user were to start to print without checking the charge adjustment value for static elimination, a static elimination control could be performed on the sheet with an inappropriate charge adjustment value set. This can cause additional electrification charge on the sheet, resulting in more sheets sticking to each other.

SUMMARY

According to an aspect of the present disclosure, a printing system, including a static elimination apparatus configured to change a setting of static elimination processing, includes at least one processor and at least one memory that is in communication with the at least one processor. The at least one memory stores instructions for causing the at least one processor and the at least one memory to acquire a type of a sheet to be used in printing processing, acquire a printing environment, acquire a rough indication value for a charge adjustment value for a static elimination corresponding to the type of the sheet and the printing environment, and control a display unit to perform display of the rough indication value for the charge adjustment value for the static elimination and to perform display to give an instruction for continuation of the printing processing.

Further features of various embodiments will become apparent from the following description of exemplary embodiments with reference to the attached drawings.

BRIEF DESCRIPTION OF THE DRAWINGS

FIG. 11 illustrates an example of a charge adjustment value table.

DESCRIPTION OF THE EMBODIMENTS

Exemplary embodiments of the present disclosure will now be described with reference to the drawings.

The following exemplary embodiments do not limit the claims, and not all of the combinations of features described in the exemplary embodiments are used for solving means of every embodiment.

Figure 1:
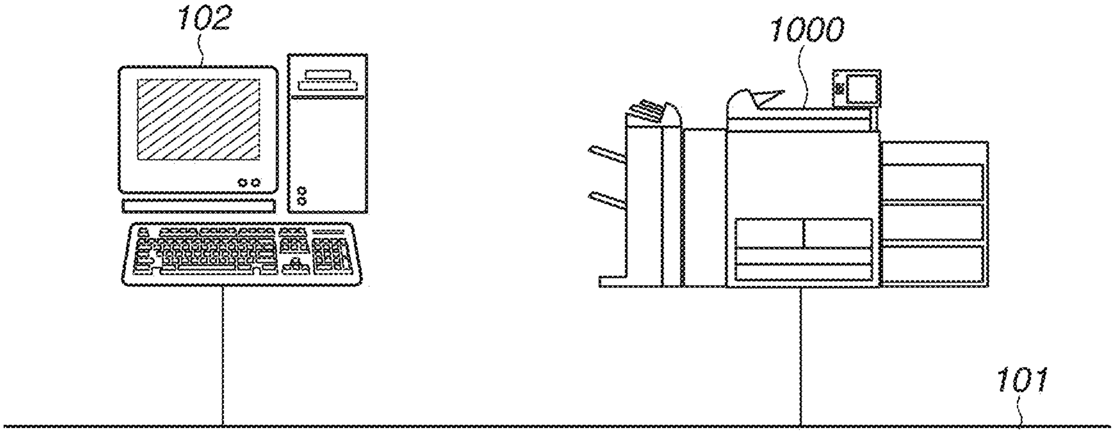
FIG. 1 is a diagram illustrating a general configuration example of a system according to a first exemplary embodiment.

A first exemplary embodiment will be described. FIG. 1 is a diagram illustrating a general configuration example of a system according to the present exemplary embodiment of the present disclosure.

The system according to the present exemplary embodiment includes a printing system 1000 and a personal computer (PC) 102 as a client computer, which are connected to each other via a network 101.

The PC 102 is capable of transmitting code data (in a page description language) as a print job via the network 101 to the printing system 1000.

Figure 2:
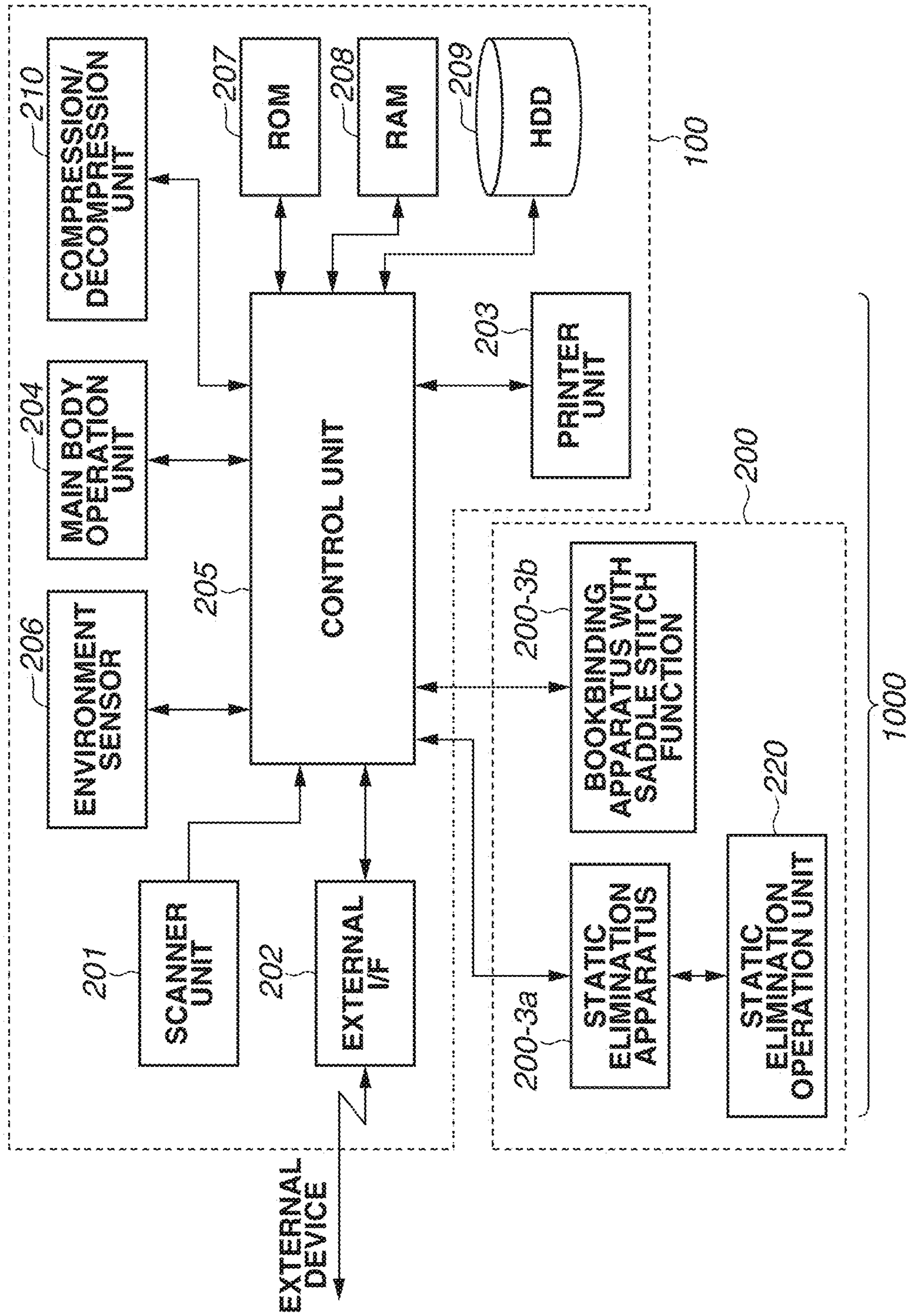
FIG. 2 is a block diagram illustrating an example of the hardware configuration of a printing system according to the present exemplary embodiment.

FIG. 2 is a block diagram illustrating an example of the hardware configuration of the printing system 1000. The printing system 1000 includes a printing apparatus 100 and a sheet processing apparatus 200, each of which is a part surrounded by a dotted line in FIG. 2. A desired number of sheet processing apparatuses 200 can be connected to the printing apparatus 100. A description of the sheet processing apparatus 200 according to the present exemplary embodiment will be given by taking an example of the sheet processing apparatus 200 including a static elimination apparatus 200-3*a* and a bookbinding apparatus with a saddle stitch function 200-3*b*. Additionally, in the present exemplary embodiment, a description of the printing apparatus 100 will be given by taking an example of a multi-function peripheral (MFP) having a plurality of functions, such as a copy function and a printer function. However, the printing apparatus 100 can be a single function printing apparatus having the copy function or the printer function alone. In the present exemplary embodiment, the description is given assuming that the printing system 1000 satisfies the following various configuration conditions as one example.

In the printing system 1000, the sheet processing apparatus 200 connected to the printing apparatus 100 performs sheet processing on a sheet (also referred to as "paper") subjected to printing by the printing apparatus 100. However, the printing system 1000 can include the printing apparatus 100 alone without the connection of the sheet processing apparatus 200.

Static Elimination Apparatus

The static elimination apparatus 200-3*a* is communicable with the printing apparatus 100. When receiving an instruction from the printing apparatus 100, the static elimination apparatus 200-3*a* performs static elimination processing, which will be described below.

Figure 5:
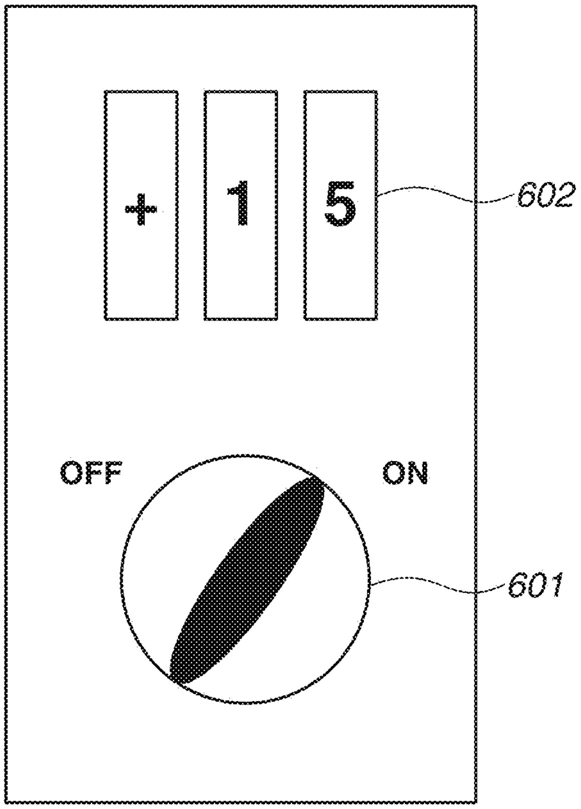
FIG. 5 illustrates an example of an operation unit on a static elimination apparatus included in the printing system according to the present exemplary embodiment.

A static elimination operation unit 220 is configured as illustrated in FIG. 5, which will be described below, and a user can make settings regarding the static elimination apparatus 200-3*a* via the static elimination operation unit 220.

It can be configured for a user to make settings regarding the static elimination apparatus 200-3*a* via a main body operation unit 204, which will be described below.

Bookbinding Apparatus with Saddle Stitch Function

A bookbinding apparatus with a saddle stitch function 200-3*b* is communicable with the printing apparatus 100. When receiving an instruction from the printing apparatus 100, the bookbinding apparatus with the saddle stitch function 200-3*b* performs sheet processing, which will be described below.

Print Apparatus

A scanner unit 201 reads an image on a document, converts the image into image data, and transfers the image data to another unit.

An external interface (I/F) 202 transmits/receives data to/from an external device connected to the network 101.

A printer unit 203 prints an image based on the input image data on a sheet.

Figure 4:
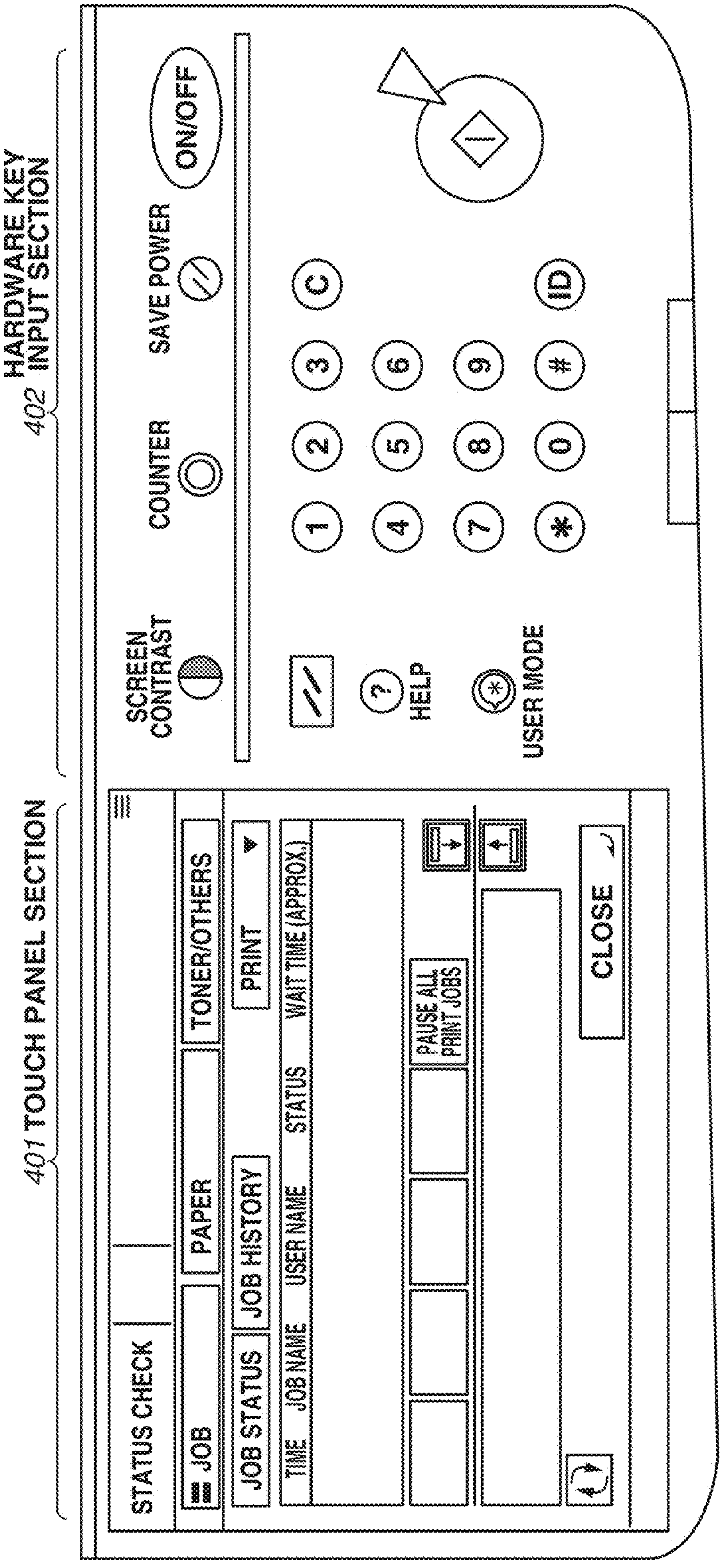
FIG. 4 illustrates an example of an operation unit on a printing apparatus included in the printing system according to the present exemplary embodiment.

The main body operation unit 204 includes a touch panel section 401 and a hardware key input section 402 as illustrated in FIG. 4, and accepts instructions from the user via the touch panel section 401 or the hardware key input section 402. Additionally, the main body operation unit 204 displays various kinds of information on the touch panel section 401.

A central processing unit (CPU) 205 is a central control device, and performs the general control of processing and operations of various kinds of units included in the printing system 1000. Thus, the CPU 205 controls operations of the printing apparatus 100 and operations of the sheet processing apparatus 200 connected to the printing apparatus 100.

An environment sensor 206 is a general term of sensors that detect an installation environment, such as temperatures and humidities, and corresponds to a temperature sensor and a humidity sensor in the present exemplary embodiment. A typical example of the temperature sensor is a thermistor that measures temperatures in the air. A typical example of the humidity sensor is a sensor that detects humidities in the air by change in static capacitance, and that produces outputs as electric signals. The CPU 205 constantly monitors temperatures and humidities in an environment in which the printing apparatus 100 is installed, and reflects temperatures and humidities in control of the printing apparatus 100.

A read-only memory (ROM) 207 stores various kinds of computer programs to be executed by the CPU 205.

For example, the ROM 207 stores programs for causing the CPU 205 to execute various kinds of processing in flowcharts described below and a display control program for displaying various kinds of setting screens described below. Additionally, the ROM 207 stores programs for causing the CPU 205 to execute an operation of interpreting page description language (PDL) code data received from the PC 102 and rasterizing the PDL code data into raster image data.

In addition, the ROM 207 stores boot sequences and font information.

A random-access memory (RAM) 208 stores image data and PDL code data transmitted from the scanner unit 201 and the external I/F 202, various kinds of programs loaded from the ROM 207, and setting information. Additionally, the RAM 208 stores information regarding the sheet processing apparatus 200 (information regarding the type and functions of the sheet processing apparatus 200 connected to the printing apparatus 100). The CPU 205 is capable of using these pieces of information regarding the sheet processing apparatus 200, which are stored in the RAM 208, for the control of the CPU 205.

A hard disk drive (HDD) 209 includes a hard disk or hard disks and a drive unit that reads/writes data from/to the hard disk(s). The HDD 209 is a high-capacity storage device for storing image data that is input from the scanner unit 201 and compressed by a compression/decompression unit 210. The CPU 205 is capable of printing image data stored in the HDD 209 using the printer unit 203 based on instructions from the user. Additionally, the HDD 209 is also used as a spooler, and the CPU 205 is capable of managing the PDL code data received from the PC 102 as a print job and storing the PDL code data in the HDD 209. Furthermore, the CPU 205 is capable of managing print jobs stored in the HDD 209, and acquiring the number of print jobs stored and setting information set in the print jobs. The printing apparatus 100 can have a configuration including another storage device, such as a solid state drive (SSD) and an embedded Multi Media Card (eMMC), in substitution for or together with the HDD 209.

The compression/decompression unit 210 performs a compression/decompression operation on the image data stored in the RAM 208 or the HDD 209 using various kinds of compression schemes, such as Joint Bi-level Image Experts Group (JBIG) and Joint Photographic Experts Group (JPEG).

The printing system 1000 according to the present exemplary embodiment is a printing system including the static elimination apparatus 200-3*a* that can change settings of a static elimination function. The detail will be described below.

Figure 3:
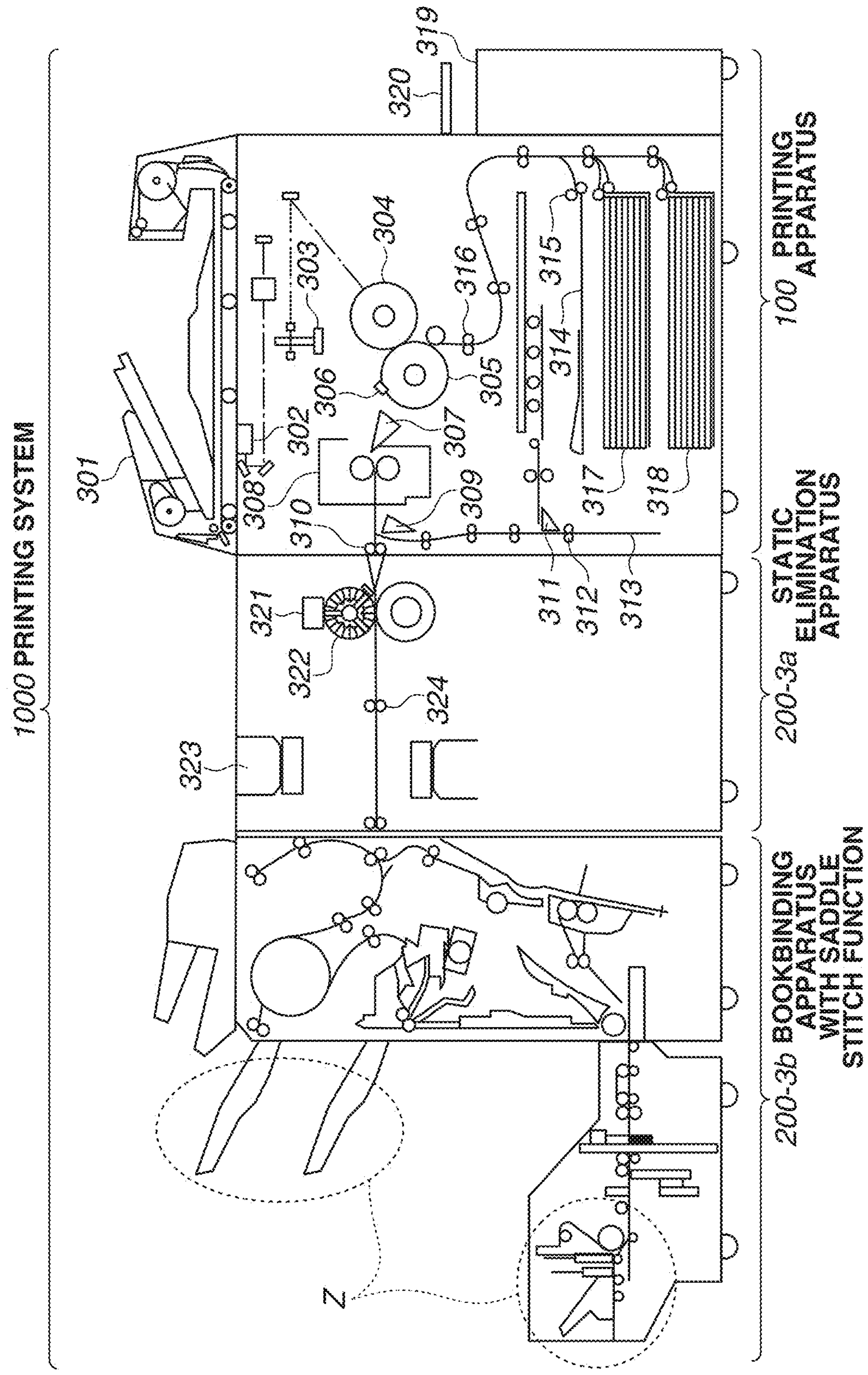
FIG. 3 illustrates an example of a cross section of the printing system according to the present exemplary embodiment.

FIG. 3 illustrates an example of a cross section regarding the printing apparatus 100 and the sheet processing apparatus 200 connected to the printing apparatus 100 in the first exemplary embodiment.

The sheet processing apparatus 200 according to the present exemplary embodiment includes the static elimination apparatus 200-3*a* and the bookbinding apparatus with the saddle stitch function 200-3*b*.

Print Apparatus

The printing apparatus 100 will now be described.

An automatic document feeder (ADF) 301 sequentially separates documents in a bundle set on the placement surface of a document tray from the first page document in the order of pages, and conveys the documents to a platen glass to be scanned by a scanner 302.

The scanner 302 reads images of the documents conveyed to the platen glass, and converts the images into image data with a charge-coupled device (CCD).

A rotary polygon mirror (a polygon mirror) 303 causes a laser beam modulated according to the image data, such as laser light, to be incident thereon, and irradiates a photosensitive drum 304 with the laser beam as reflection scan light via a reflecting mirror.

A latent image formed with the laser light on the photosensitive drum 304 is developed with toner, and the toner image is transferred to a sheet material attached to a transfer drum 305. A series of image forming processing is sequentially performed to yellow (Y) toner, magenta (M) toner, cyan (C) toner, and black (K) toner, and then a full-color image is formed. After the image forming processing is performed four times, the sheet with the full-color image on the transfer drum 305 is separated with a separation claw 306, and conveyed to a fixing device 308 by a pre-fixing conveyance device 307.

The fixing device 308 has a configuration with a combination of rollers and a belt, and includes a built-in heat source, such as a halogen heater. The fixing device 308 melts with heat and pressure the toner on the sheet to which the toner image is transferred to fix the toner image thereto.

A paper discharge flapper 309 is pivotable about a pivotal axis and regulates the conveyance direction of the sheet material. When the paper discharge flapper 309 is pivoted in the clockwise direction in FIG. 3, the sheet material is conveyed straight and discharged to the outside of the printing apparatus 100 by paper discharge rollers 310.

As described above, the CPU 205 controls the printing apparatus 100 to perform a single-sided print in a series of sequence.

On the other hand, when images are formed on both sides of the sheet material, the paper discharge flapper 309 is pivoted in the counter-clockwise direction in FIG. 3. The conveyance direction of the sheet is changed to a lower direction, and the sheet is conveyed to a double-sided conveyance unit. The double-sided conveyance unit includes an inversion flapper 311, inversion rollers 312, an inversion guide 313, and a both-surface tray 314.

The inversion flapper 311 is pivoted about its pivotal axis, and regulates the conveyance direction of the sheet material. In a case of processing a double-sided print job, the CPU 205 controls the printer unit 203 to cause the inversion flapper 311 to pivot in the counter-clockwise direction in FIG. 3, and conveys the sheet with the printed first surface to the inversion guide 313. The CPU 205 then temporarily stops the inversion rollers 312 with the trailing end of the sheet being nipped by the inversion rollers 312, and causes the inversion flapper 311 to successively pivot in the clockwise direction in FIG. 3 to rotate the inversion rollers 312 in the counterclockwise direction. This operation allows a control to switch back and convey the sheet and guide the sheet to the both-surface tray 314 with the trailing end of the sheet and the leading end of the sheet are switched.

The sheet material is temporarily on the both-surface tray 314, and then conveyed again to registration rollers 316 by re-feed rollers 315. At this time, the sheet material is conveyed so that the surface opposite from the first surface in the transfer process faces the photosensitive drum 304. Another image is formed on the second surface of the sheet in a process similar to the above-described process. The images are each formed on the corresponding surface of the surfaces of the sheet material, and the sheet material is subjected to a fixing process and discharged from the inside of the main body of the printing apparatus 100 via the paper discharge rollers 310 to the outside of the printing apparatus 100.

The CPU 205 controls the printing apparatus 100 in the sequence described above to perform a both-sided (double-sided) printing.

Additionally, the printing apparatus 100 includes a paper feed unit that stores sheets used in printing processing. Examples of the paper feed unit include paper feed cassettes 317 and 318 (each of them capable of storing, for example, 500 sheets), a paper feed deck 319 (capable of storing, for example, 5000 sheets), and a manual feed tray 320. Various kinds of sheets having different sizes and materials can be separately set in the paper feed cassettes 317 and 318 and the paper feed deck 319. Additionally, various kinds of sheets including a special sheet, such as an overhead projector (OHP) sheet, can be set in the manual feed tray 320.

Static Elimination Apparatus

The static elimination apparatus 200-3*a* will now be described.

The static elimination apparatus 200-3*a* includes a static elimination roller 322 and its paired roller, and the sheet conveyed to the static elimination apparatus 200-3*a* is conveyed while being nipped by the static elimination roller 322 and the paired roller, and subjected to a rough static elimination by the above-described static elimination roller 322. Thereafter, the sheet is subjected to static elimination processing of eliminating residual charge by an ionizer 323 while being conveyed by conveyance rollers 324 to the outside of the static elimination apparatus 200-3*a*.

Discharging Operation Unit

FIG. 5 illustrates the static elimination operation unit 220 of the static elimination apparatus 200-3*a*.

A mode setting switch 601 illustrated in FIG. 5 is used for switching between on and off, causing the elimination apparatus 200-3*a* to perform a static elimination. The CPU 205 performs a control to perform the static elimination processing only with the mode setting switch 601 turned on.

An adjustment dial 602 includes a thumb rotary switch used for adjusting intense levels of the static elimination control with the mode setting switch 601 turned on. The adjustment dial 602 is controlled by the CPU 205 so as to be activated only with the mode setting switch 601 turned on.

Static Elimination Processing

The static elimination processing performed in the static elimination apparatus 200-3*a* will now be described with reference to FIG. 6.

Figure 6:
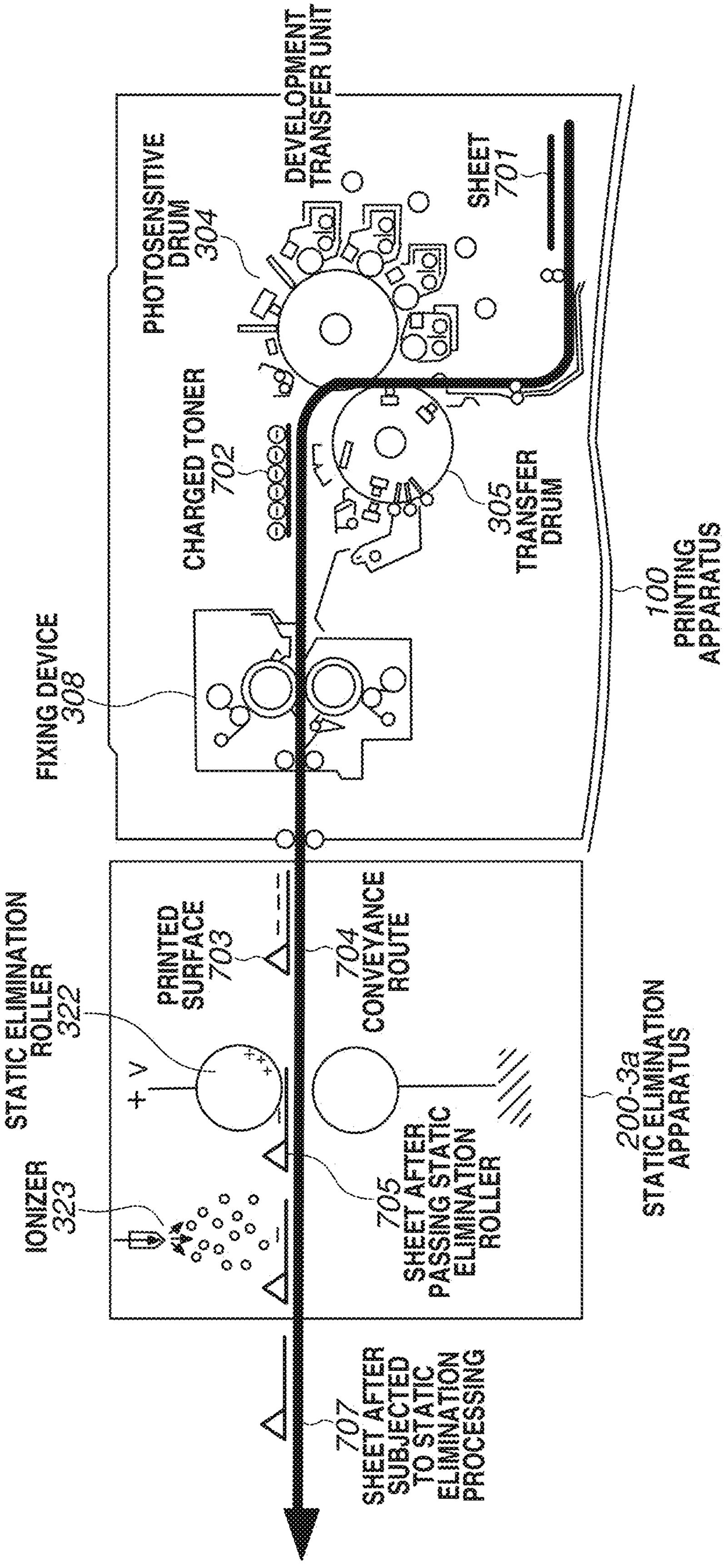
FIG. 6 is a schematic diagram illustrating how the static elimination apparatus included in the printing system according to the present exemplary embodiment executes static elimination processing.

FIG. 6 is a schematic diagram illustrating how the static elimination apparatus 200-3*a* performs the static elimination processing on a sheet subjected to printing processing by the printing apparatus 100.

First, a sheet 701 is conveyed via a conveyance route 704 to a development transfer unit including the photosensitive drum 304 and the transfer drum 305, and toner is applied to the sheet. A charged toner 702 on the sheet is negatively charged, and the sheet with a printed surface 703 negatively charged subjected to fixing by the fixing device 308 is conveyed to the static elimination apparatus 200-3*a*. The static elimination apparatus 200-3*a* includes the static elimination roller 322 positively charged that applies the positive charge to the printed surface 703 negatively charged to perform a static elimination with the static elimination roller 322 in contact with the printed surface 703 to clear the charged state. However, a negative charge left after the static elimination processing with the static elimination roller 322 or a positive charge conversely generated could remain on a sheet 705 passed through the static elimination roller 322. To address this issue, the static elimination apparatus 200-3*a* according to the present exemplary embodiment has a configuration including the ionizer 323 downstream of the static elimination roller 322. The ionizer 323 is a device that applies a voltage to the electrode needles included in the ionizer 323 to cause corona discharge to eliminate a static charge using generated ions. In this manner, static electricity is roughly eliminated with the static elimination roller 322, and its residual charge is neutralized by the ionizer, bringing a sheet 707 discharged from the static elimination apparatus 200-3*a* after the static elimination processing into a state where the static charges are eliminated.

Bookbinding Apparatus Saddle Stitch Function

The bookbinding apparatus with the saddle stitch function 200-3*b* will now be described.

Examples of sheet processing performed by the bookbinding apparatus with the saddle stitch function 200-3*b* include saddle stitch bookbinding, punching processing, cutting processing, shift sorting discharge processing, folding processing, and staple processing. These jobs are referred to as a "saddle stitch bookbinding job".

In the processing of a saddle stitch bookbinding job, the CPU 205 first causes the bookbinding apparatus with the saddle stitch function 200-3*b* to convey the sheet subjected to printing by the printing apparatus 100, and then to perform the sheet processing of the job. The CPU 205 then causes a paper discharge destination Z of the bookbinding apparatus with the saddle stitch function 200-3*b* to hold printed products of the saddle stitch bookbinding job subjected to the sheet processing performed by the bookbinding apparatus with the saddle stitch function 200-3*b*. There is a plurality of candidates in the paper discharge destination Z. This configuration allows the bookbinding apparatus with the saddle stitch function 200-3*b* to perform sheet processing with a plurality of types of sheets, and the candidates for the paper discharge destination are used when the sheets are separately discharged to different destinations depending on the sheet processing. In the present exemplary embodiment, the description of a detailed conveyance procedure for the saddle stitch bookbinding job is omitted.

Examples of sheet processing performed by the bookbinding apparatus with the saddle stitch function 200-3*b* include saddle stitch bookbinding, punching processing, cutting processing, shift sorting discharge processing, folding processing, and staple processing. These jobs are referred to as a "saddle stitch bookbinding job".

In the processing of a saddle stitch bookbinding job, the CPU 205 first causes the bookbinding apparatus with the saddle stitch function 200-3*b* to convey the sheet subjected to printing by the printing apparatus 100, and then to perform the sheet processing of the job. The CPU 205 then causes a paper discharge destination Z of the bookbinding apparatus with the saddle stitch function 200-3*b* to hold printed products of the saddle stitch bookbinding job subjected to the sheet processing performed by the bookbinding apparatus with the saddle stitch function 200-3*b*. There is a plurality of candidates in the paper discharge destination Z. This configuration allows the bookbinding apparatus with the saddle stitch function 200-3*b* to perform sheet processing with a plurality of types of sheets, and the candidates for the paper discharge destination are used when the sheets are separately discharged to different destinations depending on the sheet processing. In the present exemplary embodiment, the description of a detailed conveyance procedure for the saddle stitch bookbinding job is omitted.

Print Processing

Figure 7:
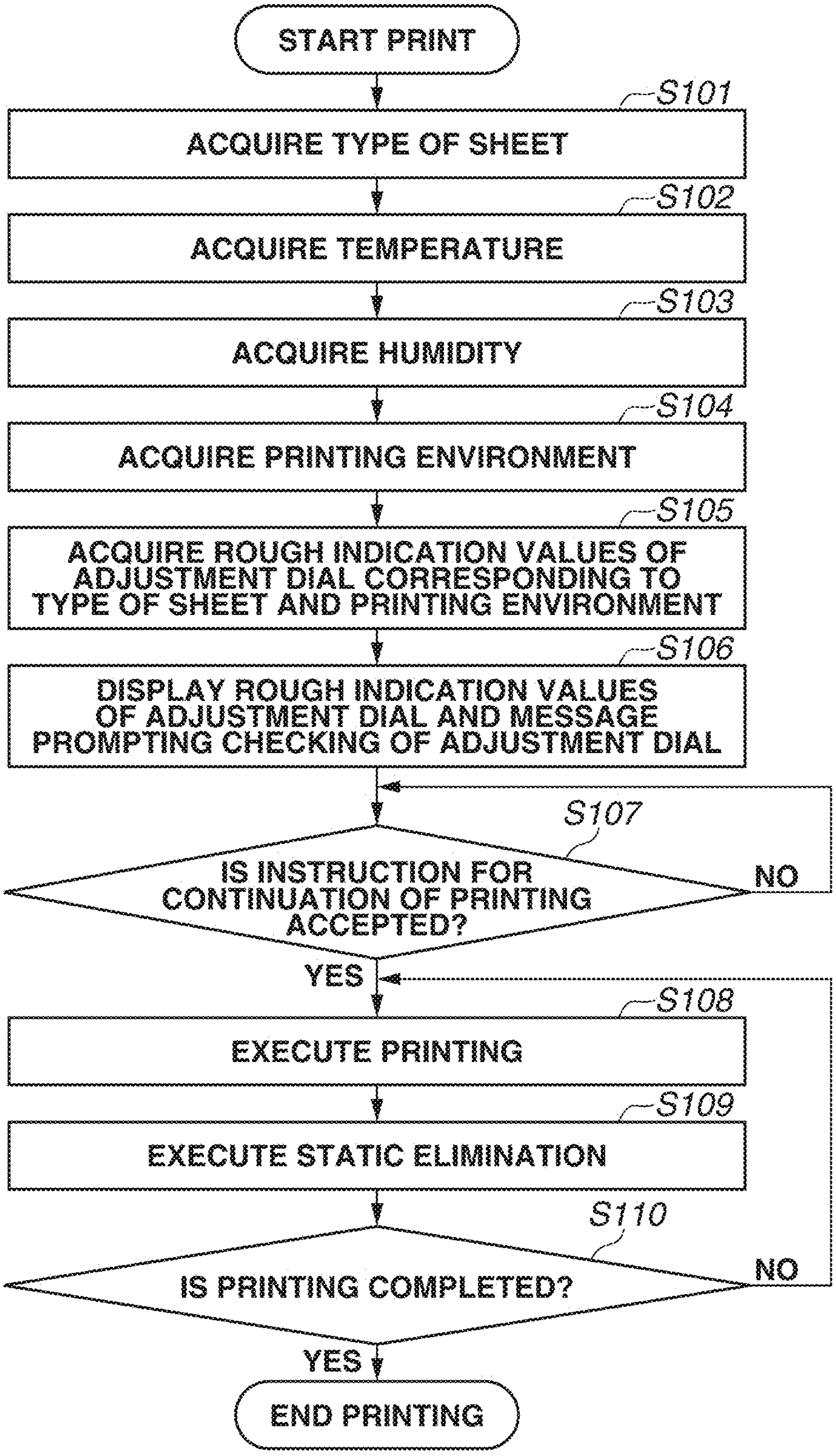
FIG. 7 is a flowchart illustrating printing processing according to the first exemplary embodiment.

FIG. 7 is a flowchart illustrating printing processing according to the first exemplary embodiment. The processing in the flowchart is performed by the CPU 205 loading programs stored in the ROM 207 or the HDD 209 into the RAM 208 and executing the programs. The present processing starts with a print job input to the printing system 1000.

When the printing processing is started, in step S101, the CPU 205 of the printing apparatus 100 interprets settings of the input print job and selects an optimum paper feed unit to acquire the type of sheet to be used in the printing.

In step S102, the CPU 205 of the printing apparatus 100 acquires temperature information detected by the environment sensor 206. In the present exemplary embodiment, the CPU 205 acquires the temperature information in units of degrees centigrade.

Similarly, in step S103, the CPU 205 of the printing apparatus 100 acquires humidity information detected by the environment sensor 206. In the present exemplary embodiment, the CPU 205 acquires the humidity information in units of percentage.

Figure 10:
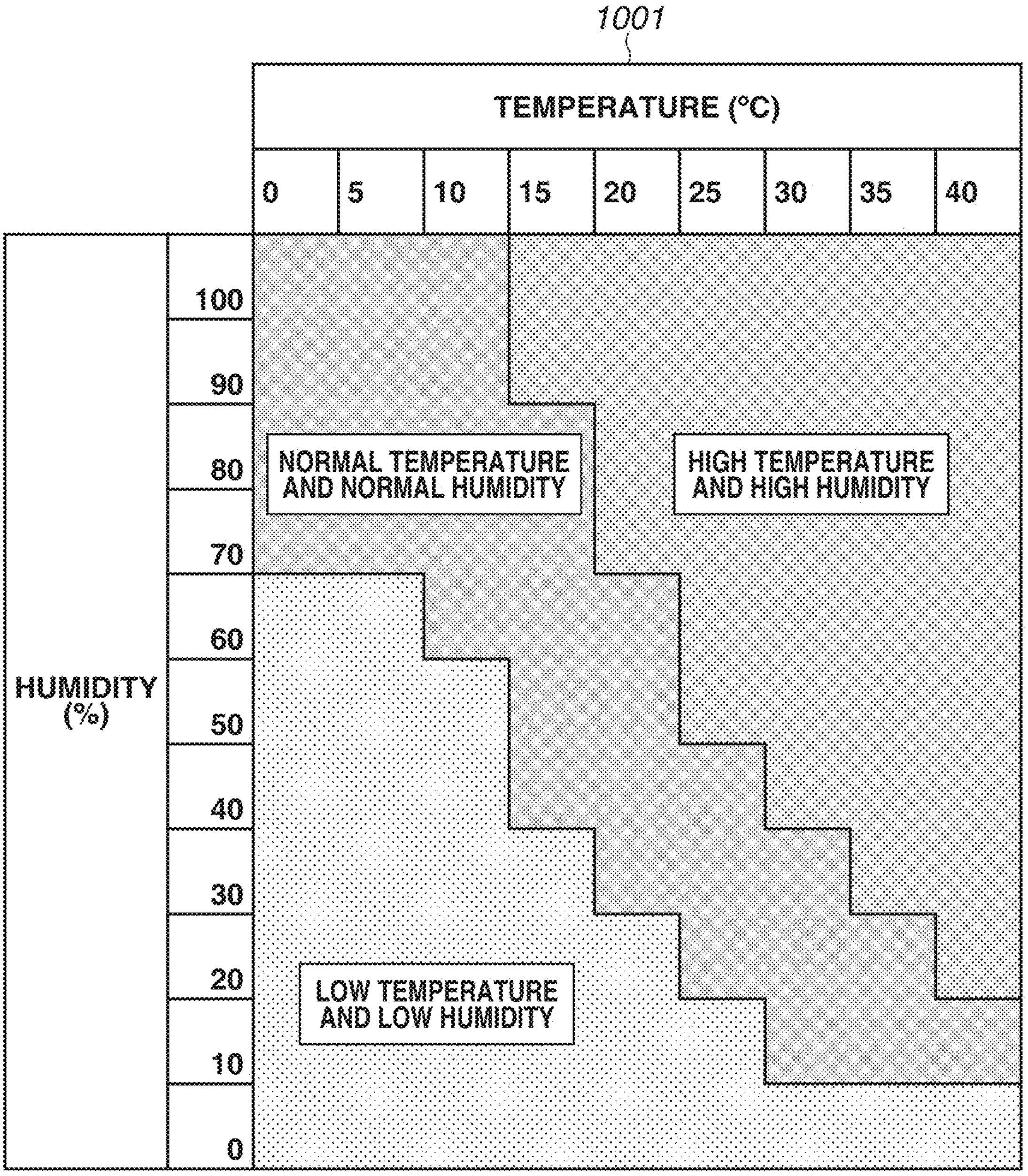
FIG. 10 illustrates an example of a printing environment table.

In step S104, the CPU 205 of the printing apparatus 100 collates the temperature information acquired in step S102 and the humidity information acquired in step S103 with an environment table 1001 in which printing environments are set, and acquires a printing environment. The environment table 1001 illustrated in FIG. 10 is preliminarily stored in the ROM 207. In the present exemplary embodiment, the printing environments are divided into three sections of a low temperature and low humidity environment, a normal temperature and normal humidity environment, and a high temperature and high humidity environment.

Environment Table

FIG. 10 is an example of printing environments of the environment table 1001 that are divided into a plurality of regions based on temperature and humidity. The temperatures indicated in a column direction of the environment table 1001 in FIG. 10 (the right-to-left direction in FIG. 10) are divided by an increment of 5° C. in a temperature range from 0 to 40 C. The humidities indicated in a row direction of the environment table 1001 (the up-and-down direction in FIG. 10) are divided by an increment of 10% from 0 to 100%.

This configuration divides the printing environments into three sections of the low temperature and low humidity environment, the normal temperature and normal humidity environment, and the high temperature and high humidity environment.

In FIG. 10, for example, when the temperature is 20 C, the printing environment corresponds to the low temperature and low humidity environment with the humidity falling within 0% to 30%, the normal temperature and normal humidity environment with the humidity falling within 30% to 70%, and the high temperature and high humidity environment with the humidity falling within 70% or more.

Subsequently, in step S105, the CPU 205 of the printing apparatus 100 acquires a rough indication value for a charge adjustment value for static elimination corresponding to the type of sheet acquired in step S101 and the printing environment acquired in step S104 from a charge adjustment value table 1101 that is stored in advance in the ROM 207 (FIG. 11).

Charge Adjustment Value Table

FIG. 11 illustrates an example of the charge adjustment value table 1101.

As illustrated in FIG. 11, rough indication values for charge adjustment values for static elimination corresponding to various types of printing environments and various types of sheets are stored in the charge adjustment value table 1101. The details of the charge adjustment value table 1101 are stored in, for example, the ROM 207.

In FIG. 11, when the type of sheet acquired in step S101 is "synthetic paper" and the printing environment acquired in step S104 is the "normal temperature and normal humidity" environment, a rough indication value for the charge adjustment value for static elimination is 30 to 50. The values represent recommended ranges when the user sets a value in the adjustment dial 602.

Figure 9:
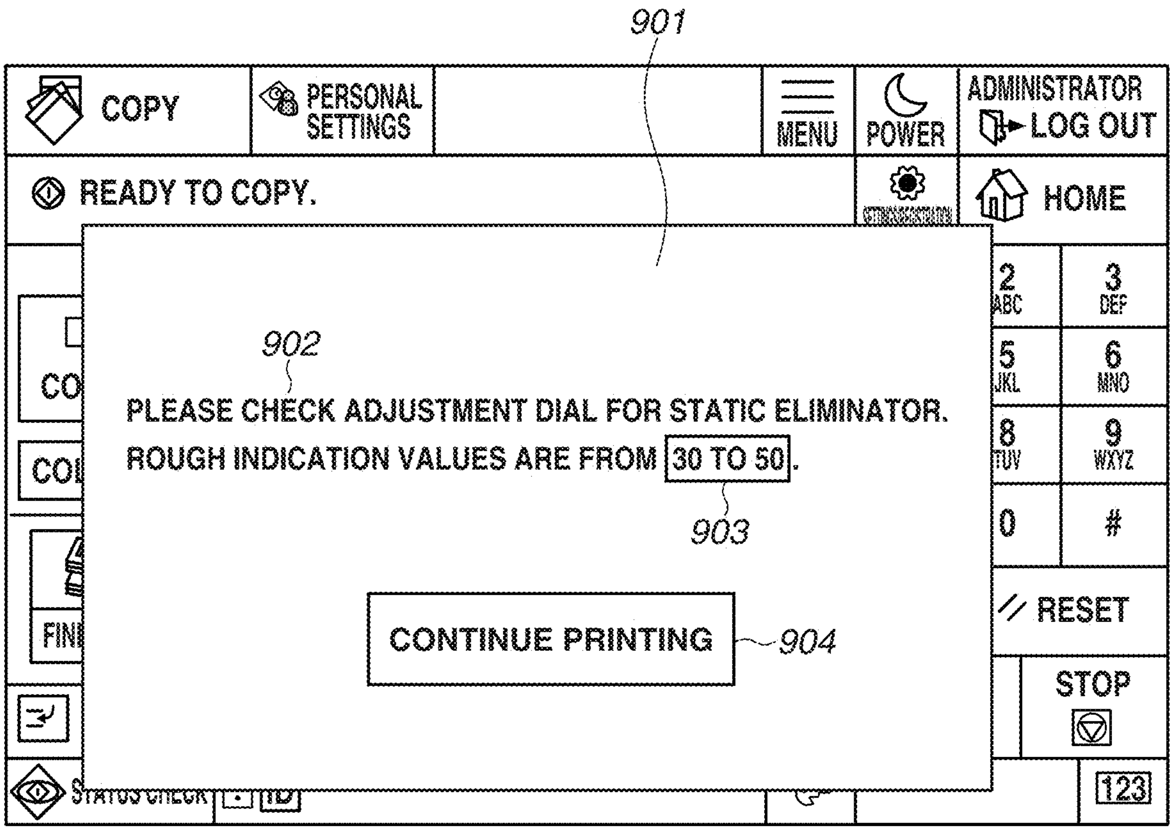
FIG. 9 illustrates an example of a printing start check screen.

In step S106, the CPU 205 of the printing apparatus 100 displays a printing start check screen 901 illustrated in FIG. 9 on the main body operation unit 204 of the printing apparatus 100.

Print Start Check Screen

FIG. 9 illustrates an example of the printing start check screen 901.

On the printing start check screen 901, the CPU 205 of the printing apparatus 100 notifies the user of a message 902 indicating that the setting value of the adjustment dial 602 of the static elimination apparatus 200-3*a* needs to be checked, displays a rough indication value 903 acquired in step S105 to check whether to continue printing. When the printing is continued, the user checks the setting of the adjustment dial 602 of the static elimination apparatus 200-3*a*, changes the setting, and presses a continue print button 904 to give an instruction for the continuation of the printing. The printing system 1000 allows a user to check whether the settings of the static elimination apparatus 200-3*a* are appropriate for the type of sheet and the printing environment, and to perform an operation on the screen to give an instruction for the continuation of the printing.

In step S107, the CPU 205 of the printing apparatus 100 determines whether the continue print button 904 is pressed on the printing start check screen 901 illustrated in FIG. 9. If determining that the continue print button 904 is not pressed (NO in step S107), the CPU 205 waits until the continue print button 904 is pressed.

On the other hand, if the CPU 205 of the printing apparatus 100 determines that the continue print button 904 is pressed (YES in step S107), the processing proceeds to step S108.

In step S108, the CPU 205 of the printing apparatus 100 resumes the printing processing based on an instruction for starting printing to perform the printing.

In step S109, the CPU 205 of the printing apparatus 100 performs static elimination processing on the sheet subjected to the printing processing based on the settings of the static elimination operation unit 220.

In step S110, the CPU 205 of the printing apparatus 100 determines whether the print job is completed. If the print job is not completed (NO in step S110), the processing returns to step S108.

On the other hand, if the print job is completed (YES in step S110), the CPU 205 of the printing apparatus 100 ends the processing in the flowchart.

As described above, in the first exemplary embodiment, the printing system 1000 including the static elimination apparatus 200-3*a* is controlled to display a rough indication value for the amount of static electricity to be eliminated by the static elimination function based on the type of sheet and the printing environment, and to display the message for prompting the user to check the setting value.

This prevents a static elimination from being performed with an inappropriate amount of static electricity to be eliminated that is unsuitable for the type of sheet and the printing environment. Thus, printing is performed with the appropriate amount of static electricity to be eliminated based on the type of sheet and the printing environment. In other words, this can reduce the possibility of the execution of a static elimination control with an inappropriate charge adjustment performed on the sheet being used in printing.

A second exemplary embodiment will now be described. In the above-described first exemplary embodiment, the description has been given of the method of displaying a rough indication value based on the type of sheet and the printing environment, and a warning to prompt a user to check the charge adjustment value for a static elimination. However, with the configuration according to the first exemplary embodiment, the warning to prompt a user to check the charge adjustment value for a static elimination may be displayed even when the charge adjustment value for the static elimination is within the range of the rough indication value. To address this issue, in the present exemplary embodiment, if the charge adjustment value for a static elimination is within the range of the rough indication value, the warning will not be displayed for prompting the user to check the charge adjustment value for the static elimination.

Print Processing

Figure 8:
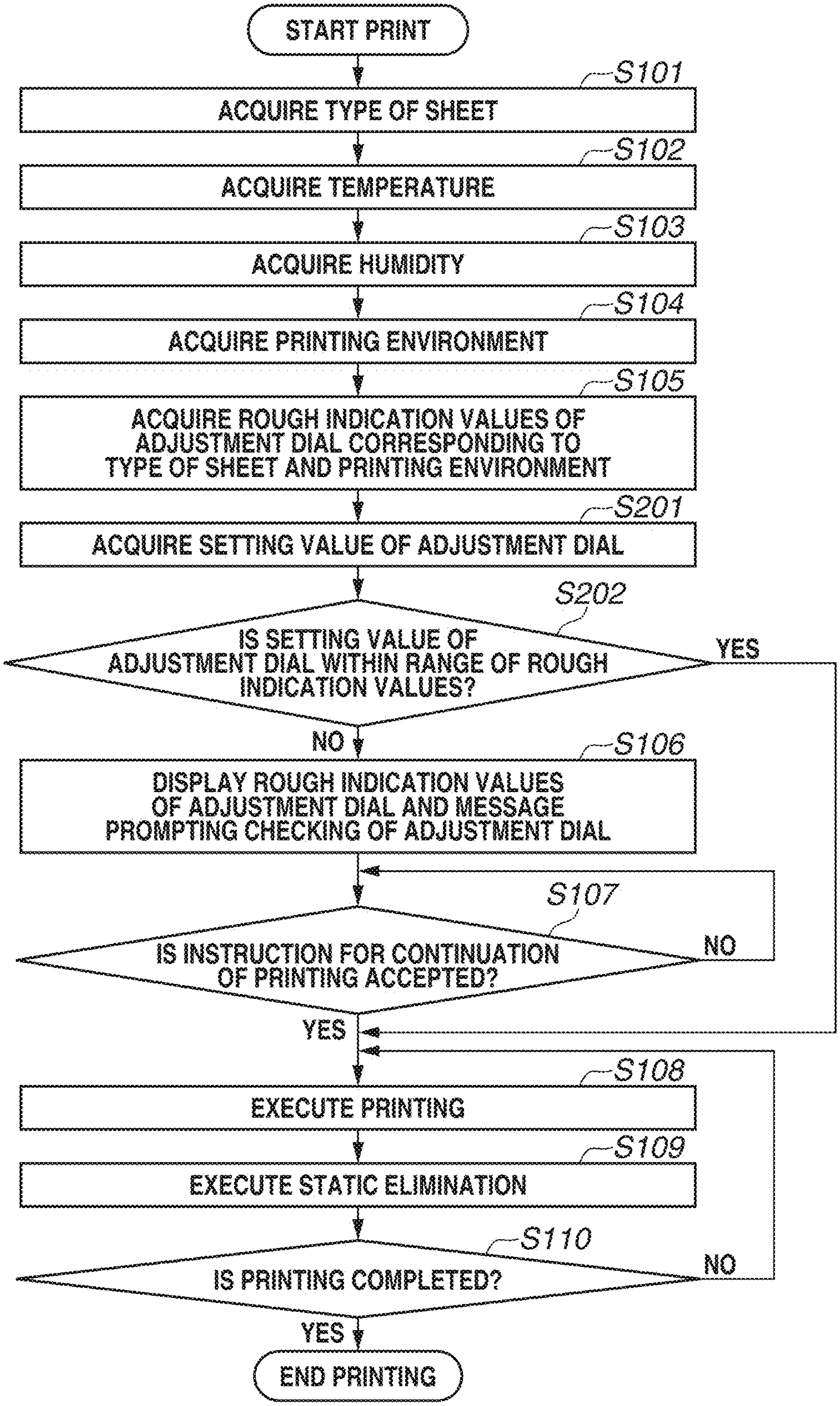
FIG. 8 is a flowchart illustrating printing processing according to a second exemplary embodiment.

FIG. 8 is a flowchart illustrating printing processing according to the second exemplary embodiment. The processing in the flowchart is performed by the CPU 205 loading programs stored in the ROM 207, the HDD 209, or the RAM 208 and executing the programs. The processing is executed with a print job input to the printing system 1000. In FIG. 8, like reference numerals refer to like steps identical to those in FIG. 7. The identical steps will be omitted, and the different steps alone will be described.

In the present exemplary embodiment, the processing proceeds to step S201 after step S105.

Subsequently, in step S201, the CPU 205 of the printing apparatus 100 acquires a setting value of the static elimination apparatus 200-3*a* regarding the amount of static electricity to be eliminated. The processing is performed by the CPU 205 acquiring the setting state of the adjustment dial 602 in the static elimination operation unit 220 via the static elimination apparatus 200-3*a*.

In step S202, the CPU 205 of the printing apparatus 100 checks whether the value of the adjustment dial 602 acquired in step S201 is within the range of the rough indication value acquired in step S105.

If the setting value is not within the range of the rough indication value (NO in step S202), the processing proceeds to step S106.

If the setting value is within the range of the rough indication value (YES in step S202), the CPU 205 of the printing apparatus 100 determines that the printing can be continued as it is, and the processing proceeds to step S108. Thus, in this case, the CPU 205 of the printing apparatus 100 does not display the warning to prompt the user to check the charge adjustment value for static elimination.

In this manner, if the setting value of the adjustment dial 602 is within the range of the rough indication value for the static elimination setting based on the type of sheet and the printing environment in the printing processing, the CPU 205 performs the following control. The CPU 205 controls the printing system 1000 including the static elimination apparatus 200-3*a* so as not to check whether to continue the printing processing. This configuration can prevent the warning to prompt a user to check the charge adjustment value for a static elimination being displayed.

As described above, according to the exemplary embodiments, a static elimination is performed with an appropriate amount of charge suitable for the type of sheet and the printing environment. Consequently, even when the type of sheet or the printing environment is changed, a situation can be prevented where a static elimination is performed on the sheet with inappropriate static elimination settings. In other words, this reduces the possibility of a static elimination control executed with an inappropriate charge adjustment on the sheet.

The above-described configurations and details of various kinds of data are not limited thereto, and it goes without saying that the data has various configurations and details depending on the intended use and purposes.

Other Exemplary Embodiments

Embodiments of the present disclosure can also be implemented by a process of a program that carries out one or more functions according to the exemplary embodiments described above being supplied to a system or an apparatus via a network or a storage medium, and one or more processors in a computer of the system or the apparatus reading and executing the program. Furthermore, some embodiments of the present disclosure can also be implemented with a circuit (e.g., an application specific integrated circuit (ASIC)) that carries out one or more functions.

While exemplary embodiments have been described above, some embodiments can take, for example, a form as a system, an apparatus, a method, a program, and a storage medium. Specifically, some embodiments can also be applied to a system including a plurality of devices or an apparatus constituting one device.

Additionally, all the configurations obtained by a combination of the above-described exemplary embodiments are included in the present disclosure.

Embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2024-000437, which was filed on Jan. 5, 2024 and which is hereby incorporated by reference herein in its entirety.

What is claimed is:

1. A printing system including a static elimination apparatus configured to change a setting of static elimination processing, the printing system comprising:

at least one processor; and at least one memory that is in communication with the at least one processor, wherein the at least one memory stores instructions for causing the at least one processor and the at least one memory to:

acquire a type of a sheet to be used in printing processing;

acquire a printing environment;

acquire a rough indication value for a charge adjustment value for a static elimination corresponding to the type of the sheet and the printing environment; and control a display unit to perform display of the rough indication value for the charge adjustment value for the static elimination and to perform display to give an instruction for continuation of the printing processing.

2. The printing system according to claim 1, wherein the at least one memory further stores instructions for causing the at least one processor and the at least one memory to acquire the printing environment based on a temperature and a humidity detected by a sensor.

3. The printing system according to claim 2, wherein the printing environment is divided into a plurality of sections on an environment table based on temperatures and humidities, and wherein the at least one memory further stores instructions for causing the at least one processor and the at least one memory to collate the temperature and the humidity detected by the sensor with the environment table to acquire the printing environment.

4. The printing system according to claim 1, wherein the at least one memory further stores instructions for causing the at least one processor and the at least one memory to wait to perform the printing processing until an operation on the display of giving the instruction for continuation of the printing processing is performed.

5. The printing system according to claim 1, wherein the at least one memory further stores instructions for causing the at least one processor and the at least one memory to:

acquire a setting value, and in a case where the setting value is within a range of the rough indication value for the charge adjustment value for the static elimination, control the display unit not to perform the display.

6. A method of controlling a printing system including a static elimination apparatus configured to change a setting of static elimination processing, the method comprising:

performing first acquisition to acquire a type of a sheet to be used in printing processing;

performing second acquisition to acquire a printing environment;

performing third acquisition to acquire a rough indication value for a charge adjustment value for a static elimination corresponding to the type of the sheet and the printing environment; and controlling a display unit to perform display of the rough indication value for the charge adjustment value for the static elimination and to perform display to give an instruction for continuation of the printing processing.

7. A computer-readable storage medium that stores computer-executable instructions for causing a computer to execute a method of controlling a printing system including a static elimination apparatus configured to change a setting of static elimination processing, the method comprising:

performing first acquisition to acquire a type of a sheet to be used in printing processing;

performing second acquisition to acquire a printing environment;

performing third acquisition to acquire a rough indication value for a charge adjustment value for a static elimination corresponding to the type of the sheet and the printing environment; and controlling a display unit to perform display of the rough indication value for the charge adjustment value for the static elimination and to perform display to give an instruction for continuation of the printing processing.

* * * * *